(12) United States Patent
Kiyosawa et al.

(10) Patent No.: US 6,564,677 B1
(45) Date of Patent: May 20, 2003

(54) WAVE GEAR DRIVE HAVING A TRANSFER-TORQUE CONTROL MECHANISM

(75) Inventors: Yoshihide Kiyosawa, Nagano-ken (JP); Hideo Asawa, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 09/172,273

(22) Filed: Oct. 14, 1998

(30) Foreign Application Priority Data

Oct. 16, 1997 (JP) .............................................. 9-282437

(51) Int. Cl.$^7$ ................................................. F16H 1/32
(52) U.S. Cl. ......................................... 74/640; 475/162
(58) Field of Search ........................... 74/640; 475/162, 475/177

(56) References Cited

U.S. PATENT DOCUMENTS

| | | | | |
|---|---|---|---|---|
| 4,951,518 A | * | 8/1990 | Hendershot ................ 74/640 X |
| 5,222,409 A | * | 6/1993 | Dalakian .................. 74/640 X |
| 5,282,398 A | * | 2/1994 | Ishikawa .................... 74/640 |
| 5,485,766 A | * | 1/1996 | Ishikawa .................... 74/640 |
| 5,715,732 A | * | 2/1998 | Takizawa et al. ............. 74/640 |
| 5,775,178 A | * | 7/1998 | Asawa et al. ................ 74/640 |
| 5,782,143 A | * | 7/1998 | Ishikawa .................... 74/640 |
| 5,850,765 A | * | 12/1998 | Shirasawa ................... 74/640 |

* cited by examiner

*Primary Examiner*—Dirk Wright
*Assistant Examiner*—Peter T. Kwon
(74) *Attorney, Agent, or Firm*—Burns, Doane, Swecker & Mathis (57) ABSTRACT

A wave gear drive (1) includes an annular rigid internal gear (2), an annular flexible external gear (3) arranged inside of the annular rigid internal gear (2), and a wave generator (4) fitted inside of the annular flexible external gear. The wave generator (4) includes a rigid cam plate (41) having a predetermined outline, and a hub (43) inserted into a fitting hole (42) formed in the center of the rigid cam plate (41). A transfer-torque control mechanism for limiting the torque transferred through the wave generator (4) to the flexible external gear (3) is defined by a nut (46) that fastens the rigid cam plate (41) and the hub (42). When the torque equal to or greater than a predetermined value is transferred, a slip is generated in a rotational direction between the rigid cam plate (41) and the hub (42), thus limiting the transfer torque to a predetermined limit value. As a result, the torque limiter is not required. The use of the wave gear drive (1), therefore, makes it possible to configure a small, compact actuator for driving the robot arm or the like as well as reduce the cost.

15 Claims, 13 Drawing Sheets

View A-A'

(First example)

FIG. 1B
View A-A'
(First example)

(Second example)

FIG. 3

(Third example)

FIG. 4

(Fourth example)

FIG. 5B (Fifth example)

(Sixth example)

FIG. 7

(Seventh example)

FIG. 8

(Eighth example)

FIG. 9

(Ninth example)

(Tenth example)

FIG. 13

(Eleventh example)

WAVE GEAR DRIVE HAVING A TRANSFER-TORQUE CONTROL MECHANISM

BACKGROUND OF THE INVENTION

1. Field of the Invention

The present invention relates to a wave gear drive, or more in particular, to a wave gear drive having a transfer-torque control mechanism that prevents excessive torque transfer.

2. Prior Art Description

It is well known that an actuator built in a robot arm or the like employs a wave gear drive as a reduction mechanism for reducing the rotational speed of a motor serving as a drive source.

The wave gear drive basically includes an annular rigid internal gear, an annular flexible external gear arranged inside of the annular rigid internal gear, and a wave generator fitted inside of the annular flexible external gear. The wave generator has an outline of, for example, an elliptical shape, and urges the flexible external gear radially so as to be brought into partial engagement with the rigid internal gear. When the wave generator is connected to the high-speed rotation input shaft such as the motor and rotates at a high speed, the engaging points of both two gears move along the circumferential direction. As a result, a relative rotational motion corresponding to the difference in the number of teeth of both gears is generated therebetween. As the rigid internal gear is generally fixed, the output of reduced rotational speed is derived from the flexible external gear.

When a member at a driven side such as a robot arm collides with other member during operation, the torque generated by the collision is transferred in the reverse direction through the power transmission path from the motor to the driven member via the wave gear drive or the like. The turning force including the input side inertia of the motor or the like acts on each member constituting the power transmission path, thus generating excessive torque. As a result, various problems resulting from the excessive torque may occur, for example, the portion constituting the flexible external gear of the wave gear drive is damaged.

A method for preventing the aforementioned problem has been generally taken by mounting a transfer-torque control mechanism on such portion as the motor output shaft so as to prevent the transfer of the torque exceeding the limited value.

Mounting the aforementioned transfer-torque control mechanism, however, may increase the number of parts constituting the power transmission path, thus requiring a larger installation space as well as increasing the cost.

SUMMARY OF THE INVENTION

It is an object of the present invention to propose a wave gear drive with a compact transfer-torque control mechanism built therein for preventing the aforementioned problems.

In order to achieve the above-described and other objects, according to the present invention, there is provided a wave gear drive including an annular rigid internal gear, an annular flexible external gear arranged inside of the annular rigid internal gear, and a wave generator fitted inside of the annular flexible external gear, in which the wave generator urges said flexible external gear radially so as to be partially in mesh with the rigid internal gear, and moves points of partial engagement in the circumferential direction so as to generate a relative rotation between the rigid internal gear and the flexible external gear corresponding to the difference in the number of teeth therebetween, characterized in that the wave generator includes a rigid cam plate having a predetermined outline and a hub inserted into a fitting hole formed in the center of the rigid cam plate; and the wave generator further includes a transfer-torque control mechanism for limiting a torque transferred to the flexible external gear through the wave generator, the transfer-torque control mechanism being configured to fasten the rigid cam plate and the hub so as to generate a slip in a rotational direction by transferring the torque exceeding a predetermined value.

According to a preferred embodiment, the wave generator includes an outer annular hub with an Oldham's mechanism fitted in the fitting hole formed in the center of the rigid cam plate and an inner annular hub inserted inside of the outer annular hub, both of which constitute the hub; and the transfer-torque control mechanism includes an annular flange radially expanding outward and formed at one end of the inner annular hub in an axial direction, an external thread formed on the outer peripheral surface of the other end of the inner annular hub in the axial direction, and a nut having an internal thread formed on the inner peripheral surface so as to be screwed with the external thread, and the outer annular hub is urged against the annular flange by the nut.

According to another preferred embodiment, the transfer-torque control mechanism includes an annular flange radially expanding outward and formed at one end of the hub in an axial direction, an external thread formed on the outer peripheral surface of the other end of the annular hub in the axial direction, and a nut having an internal thread formed on the inner peripheral surface so as to be screwed with the external thread, and the rigid cam plate is urged against the annular flange by the nut.

In this embodiment, the hub can be integrated with an input shaft connected thereto.

Also the external thread and the nut can be replaced by an axially extending bolt hole formed in the end surface of the input shaft and a fastening bolt adapted to be screwed into the bolt hole, and the rigid cam plate is urged against the annular flange by the fastening bolt.

According to another embodiment of the invention, the wave generator is characterized in that the wave generator includes an outer annular hub with an Oldham's mechanism fitted in a fitting hole formed in the center of the rigid cam plate and an inner annular hub inserted inside of the outer annular hub, both of which constitute the hub; and the transfer-torque control mechanism includes an engaging hole formed in the outer peripheral surface of the inner annular hub, a radially extending through hole formed in the outer annular hub, a ball inserted into the through hole to be engaged with the engaging hole, and an elastic member that urges the ball radially inward.

Another embodiment of the invention is characterized in that the transfer-torque control mechanism includes an engaging hole formed in the outer peripheral surface of the hub, a radially extending through hole formed in the rigid cam plate, a ball inserted into the through hole to be engaged with the engaging hole, and an elastic member that urges the ball radially inward.

According to still another embodiment of the invention, the transfer-torque control mechanism includes an engaging hole formed in the inner peripheral surface of a fitting hole of the rigid cam plate, a radially extending through hole formed in the hub, a ball inserted into the through hole to be engaged with the engaging hole, and an elastic member that urges the ball radially outward.

According to yet another embodiment of the present invention, the wave generator includes an outer annular hub with an Oldham's mechanism fitted in a fitting hole formed in the center of the rigid cam plate, and an inner annular hub inserted inside of the outer annular hub, both of which constitute the hub; and the transfer-torque control mechanism includes an annular flange radially expanding outward and formed at one end of the inner annular hub in an axial direction, an engaging hole formed in the annular end surface of the annular flange, an axially extending through hole formed in the outer annular flange, a ball inserted into the through hole to be engaged with the engaging hole, and an elastic member that urges the ball against the engaging hole in the axial direction.

According to another embodiment of the invention, the wave generator includes an outer annular hub with an Oldham's mechanism fitted in a fitting hole formed in the center of the rigid cam plate, and an inner annular hub inserted inside of the outer annular hub, both of which constitute the hub; and the transfer-torque control mechanism includes an engaging hole formed in the outer peripheral surface of the inner annular hub, an axially extending through hole formed in the outer annular flange, a ball inserted into the through hole to be engaged with the engaging hole, and an elastic member that urges the ball against the engaging hole.

In this embodiment, the inner annular hub can be integrated with an input shaft connected thereto.

Also, the outer annular hub and the rigid cam plate can be formed as the integrated portion.

Next, according to still another embodiment of the invention, the transfer-torque control mechanism includes an engaging hole formed in the outer peripheral surface of the hub, a radially extending through hole formed in the rigid cam plate, a roller inserted into the through hole to be engaged with the engaging hole, and an elastic member that urges the roller radially inward; and the engagement between the axial end surfaces of the engaging hole and the end surfaces of the roller prevents displacement of the rigid cam and the annular hub in the axial direction.

According to another embodiment of the invention, the transfer-torque control mechanism includes at least one pin inserted into the rigid cam plate and the hub, and a breaking torque of the pin is set to assume a predetermined value.

In this embodiment, the hub can be integrated with an input shaft connected thereto.

DETAILED DESCRIPTION OF PREFERRED EMBODIMENTS

Embodiments of the present invention will be explained below with reference to the drawings. The parts shared by the drawings are designated by the same reference numerals.
(First Example)

Figure 1A:
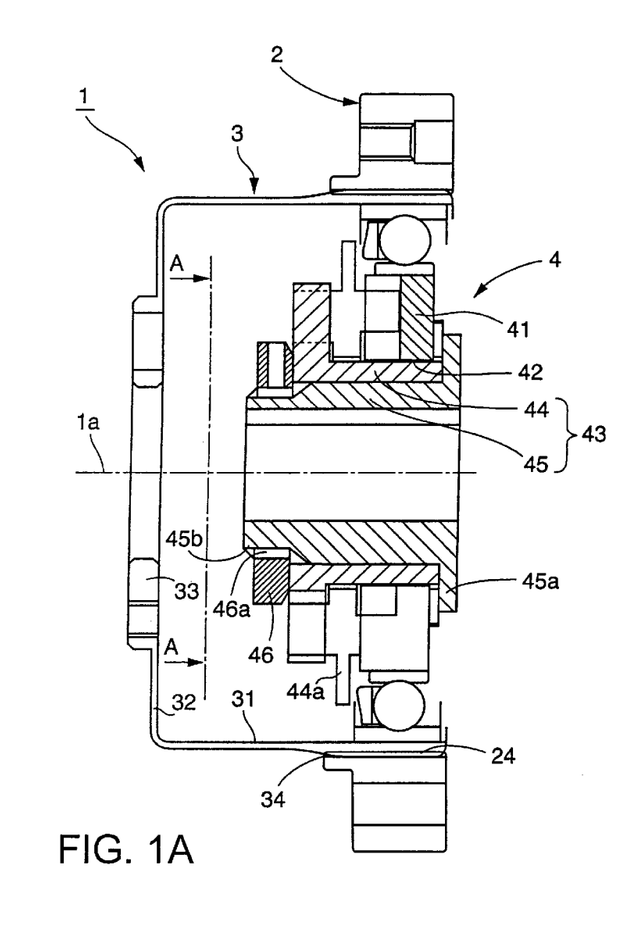
FIG. 1 shows a longitudinal sectional view and a partially side elevational view schematically illustrating a first embodiment of a wave gear drive to which the present invention is applied.
Figure 1B:
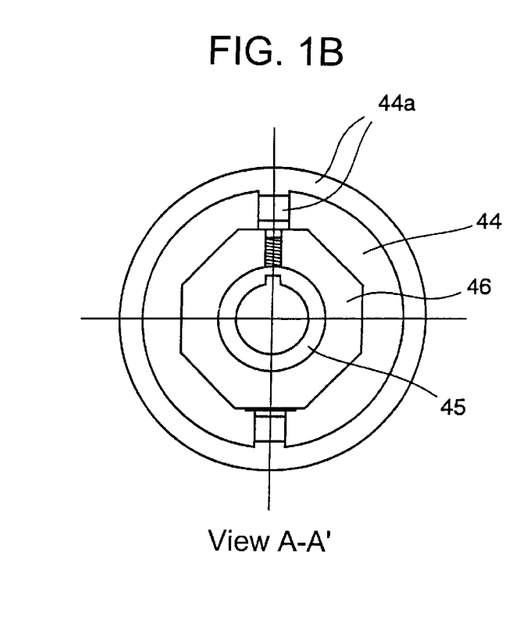

FIG. 1 shows a first embodiment of a wave gear drive according to the present invention. This wave gear drive 1 includes an annular rigid internal gear 2, an annular flexible external gear 3 arranged inside of the annular rigid internal gear 2, and a wave generator 4 fitted inside of the annular flexible external gear 3. The wave generator 4 urges the flexible external gear 3 radially so as to be brought into partial engagement with the rigid internal gear 2. The wave generator 4 is also designed to generate a relative rotation corresponding to the difference in the number of teeth between the rigid internal gear 2 and the flexible external gear 3 by moving the engaging points along the circumferential direction.

The illustrated wave gear drive 1 employs the flexible external gear 3 of cup-shape type and is configured to include a cylindrical body 31, an annular diaphragm 32 sealing one end of the body 31, a thick annular boss 33 formed integrally with the inner peripheral edge of the diaphragm, and outer teeth 34 formed on the outer peripheral surface of the other open end of the body 31. The annular boss 33 is connected to the output shaft and the like on the driven side. In this case, the annular rigid internal gear 2 is secured to a member on the fixed side.

The wave generator 4 includes a rigid cam plate 41 having a predetermined outline, and a hub 43 inserted into a fitting hole 42 formed in the center of the rigid cam plate 41. As a typical example, the rigid cam plate 41 has an elliptical outline. In this case, the outer teeth 34 of the flexible external gear 3 are brought into engagement with the inner teeth 24 formed in the inner peripheral surface of the rigid internal gear 2 at both ends of the long axis of the elliptical shape.

In this case, a transfer-torque control mechanism for limiting the torque transferred to the flexible external gear 3 through the wave generator 4 is interposed between the rigid cam plate 41 and the hub 43. Specifically, in response to the state where a torque of a predetermined value or greater is transferred, a slip in rotational direction is generated between the rigid cam plate 41 and the hub 43, thereby limiting the transfer torque to a predetermined value.

As described above, in the wave gear drive according to this embodiment, as a torque limiter is not required, the actuator for driving the robot arm or the like can be configured to a small, compact form at a reduced cost.

In the wave gear drive 1 according to this embodiment, as shown in FIG. 1, the wave generator 4 includes an external annular hub 44 fitted in the fitting hole 42 formed in the center of a rigid cam plate 41 and an inner annular hub 45 inserted inside of the outer annular hub 44, both of which constitute the hub 43. An input shaft (not shown) is inserted into the inner annular hub 45 for fixation. The outer annular hub 44 has an Oldham's mechanism connected to the rigid cam plate 41 through an insert 44a.

The transfer-torque control mechanism includes an annular flange 45a radially expanding outward and formed at one end of the inner annular hub 45 in an axial direction 1a, an external thread 45b formed on the outer peripheral surface at the other end of the inner annular hub 45 in the axial direction 1a, and a nut 46 having an internal thread 46a formed on the inner peripheral surface to be screwed with the external thread 45b. The outer annular hub 44 is urged against the annular flange 45a by the nut 46.

In the transfer-torque control mechanism of the wave gear drive 1 configured as described above, the upper limit value of the torque transferred through the outer annular hub 44 and the inner annular hub 45 is defined by the frictional engaging force generated therebetween by the fastening force of the nut 46. Therefore in the case where the torque exceeding the upper limit value is transferred, a slip in the rotational direction is generated between the outer annular hub 44 and the inner annular hub 45.

(Second Example)

Figure 2:
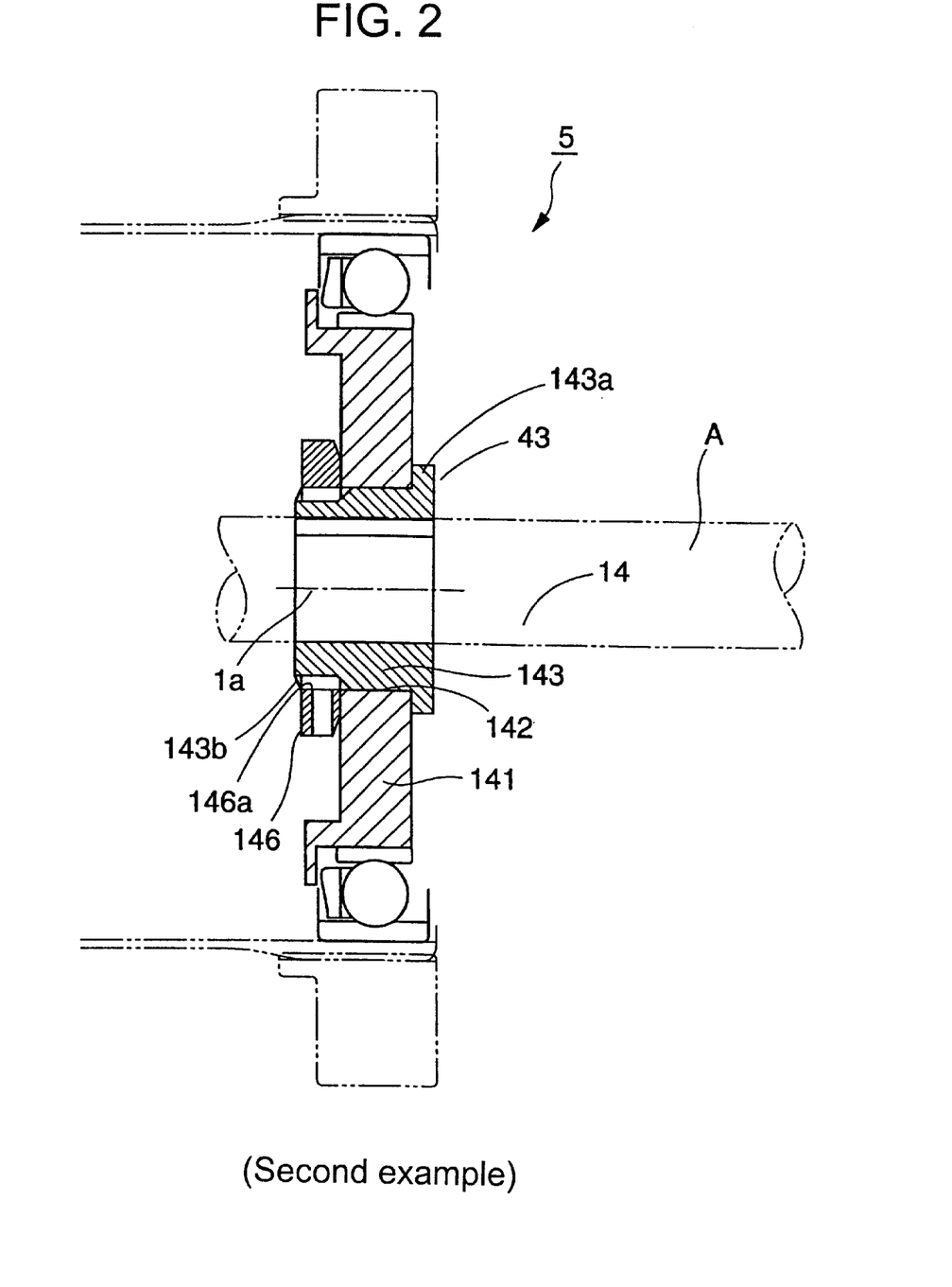
FIG. 2 shows a diagram schematically illustrating a configuration of the essential parts of a second embodiment of a wave gear drive to which the present invention is applied.

FIG. 2 shows a second embodiment of the wave gear drive according to the invention. This wave gear drive 5 has a basic configuration similar to that of the wave gear drive 1 shown in FIG. 1. The explanation of the configuration, thus, will be omitted. A wave generator 14 of a wave gear drive 5 includes a rigid cam plate 141 having a predetermined outline, and an annular hub 143 fitted in a fitting hole 142 formed in the center of the rigid cam plate 141.

The transfer-torque control mechanism includes an annular flange 143a radially expanding outward and formed at one end in the axial direction 1a of the annular hub 143 of the wave generator 14, an external thread 143b formed on the outer peripheral surface of the other end of the annular hub 143 in the axial direction 1a, and a nut 146 having an internal thread 146a formed on the inner peripheral surface so as to be screwed with the external thread 143b. The rigid cam plate 141 is urged against the annular flange 143a by the nut 146.

In the transfer-torque control mechanism in this case, the frictional engaging force between the annular hub 143 and the rigid cam plate 141 is defined by the force generated by the nut 146 for fastening those members. Therefore, this fastening force defines the upper limit value of the torque transferred through these members. In the case where the torque exceeding the upper limit value is transferred, a slip is generated in the rotational direction between the annular hub 143 and the rigid cam plate 141.

(Third Example)

Figure 3:
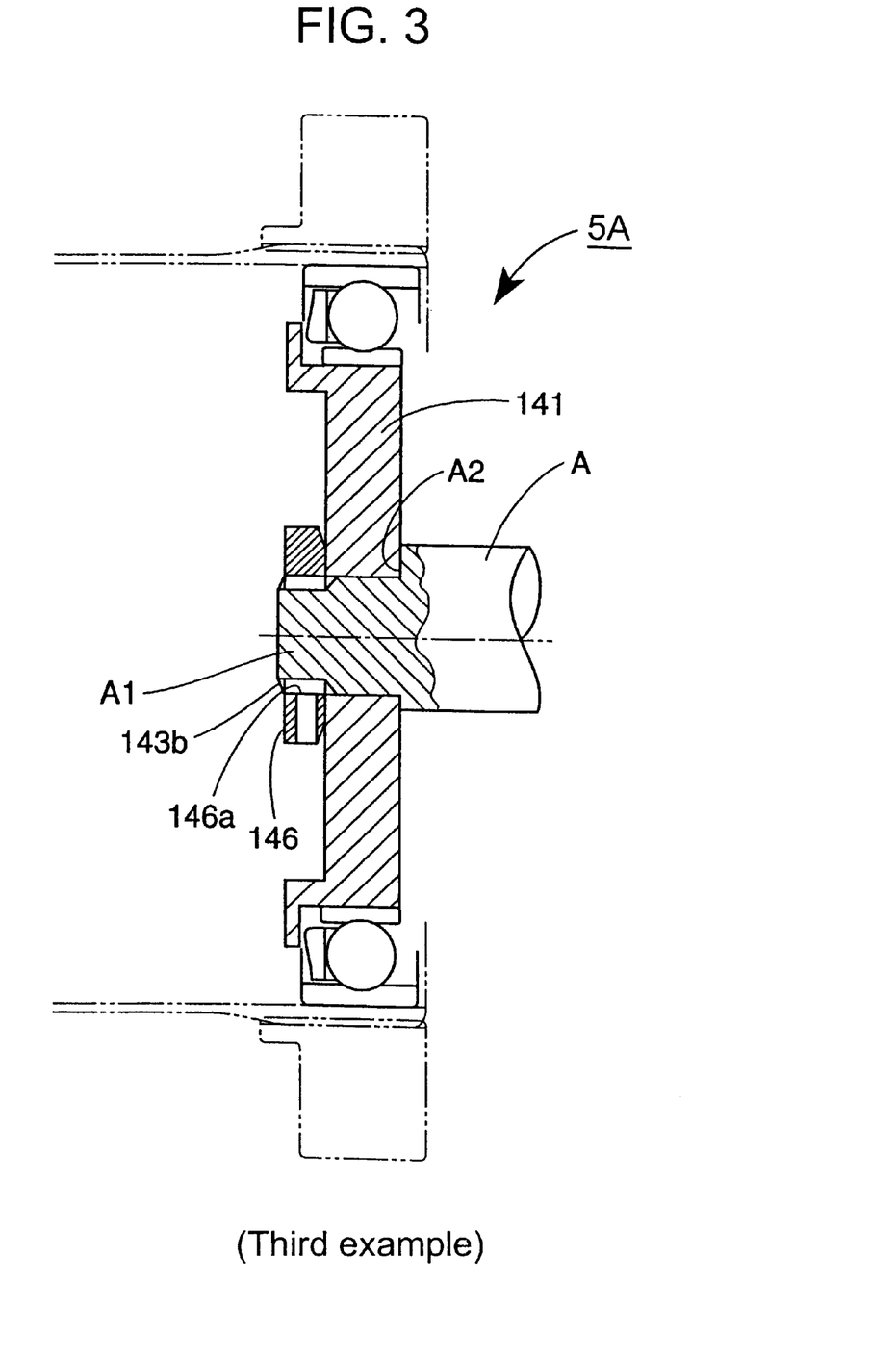
FIG. 3 shows a diagram schematically illustrating a configuration of the essential parts of a third embodiment of a wave gear drive to which the present invention is applied.

FIG. 3 shows the essential parts of a third embodiment of the wave gear drive according to this invention. The basic configuration of the wave gear drive 5A is similar to that of the wave gear drive 5 as shown in FIG. 2 except that the annular hub and the input shaft A are integrally formed as a single part. Therefore the top end of the input shaft A has a small-diameter fitting portion A1 formed therein, and an annular end surface A2 is formed between the fitting portion A1 and the other portion. This annular end surface A2 has the similar function to that of the annular flanges 45a or 143a as described above. Also, the outer peripheral surface of the end of the small-diameter fitting portion A1 has an external thread 143b formed thereon into which the nut 146 is screwed.

(Fourth Example)

Figure 4:
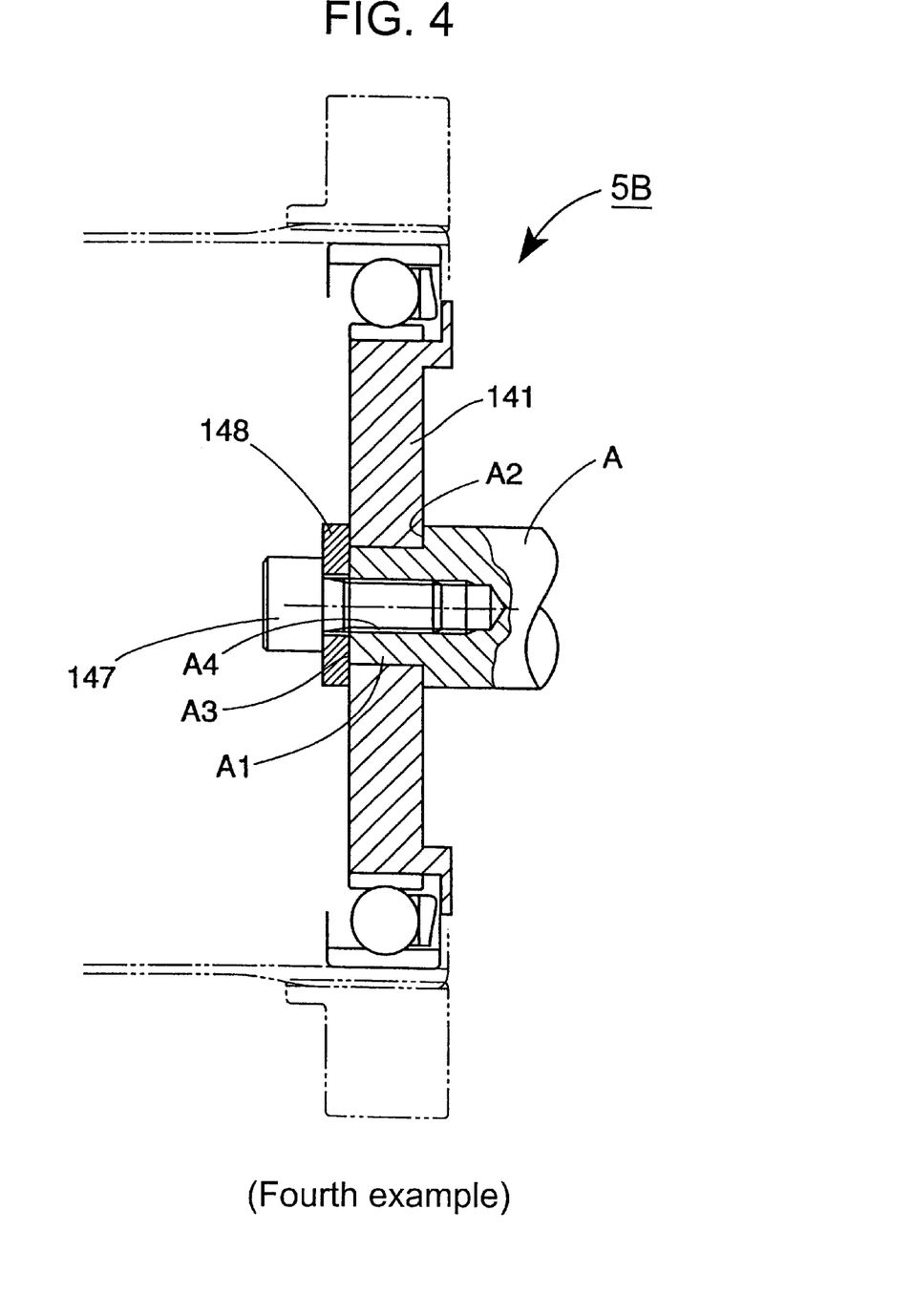
FIG. 4 shows a diagram schematically illustrating a configuration of the essential parts of a fourth embodiment of a wave gear drive to which the present invention is applied.

Next, FIG. 4 shows the essential parts of a fourth embodiment of the wave gear drive according to this invention. This wave gear drive 5B has a basic configuration similar to that of the wave gear drive 5A shown in FIG. 3 except that the external thread 143a and the nut 146 of the wave gear drive shown in FIG. 3 are replaced by an axially extending bolt hole A4 formed in the end surface A3 of the input shaft A and a fastening bolt 147 adapted to be screwed into the bolt hole A4. The fastening bolt 147 urges the rigid cam plate 141 against the end surface A2 functioning as the annular flange.

In the example shown in the drawing, a washer 148 is interposed between the head of the fastening bolt 147 and the end surface of the rigid cam plate 141. It is also possible to integrate the fastening bolt 147 with the washer as a single part.

(Fifth Example)

Figure 5A:
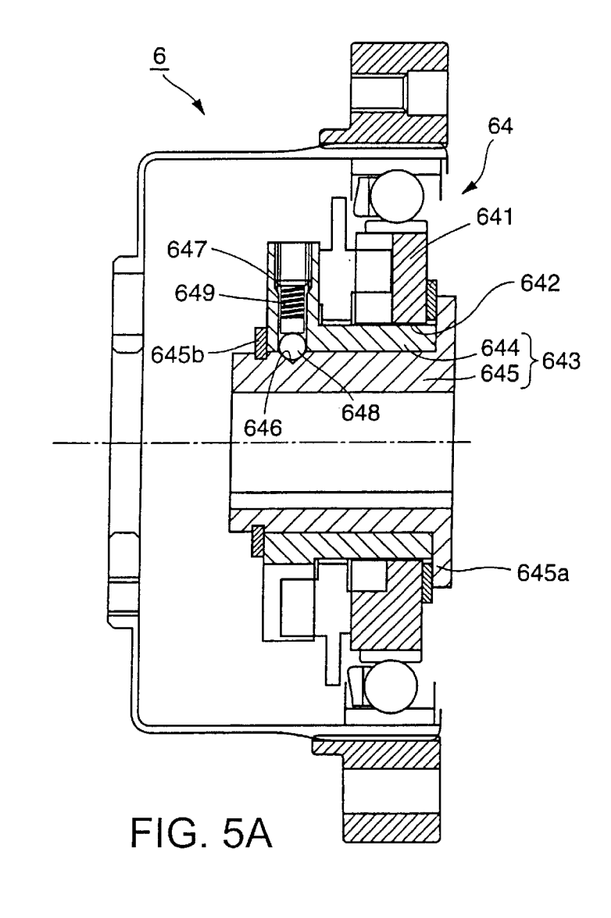
FIG. 5 shows a longitudinal sectional view and a diagram schematically illustrating a configuration of the essential parts of a fifth embodiment of a wave gear drive to which the present invention is applied.
Figure 5B:
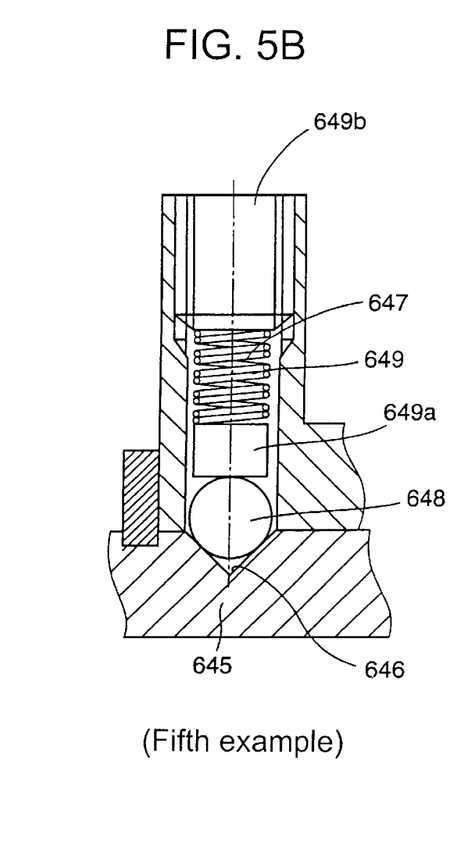

FIG. 5 shows a fifth embodiment of the wave gear drive according to this invention. As the basic configuration of this wave gear drive 6 is similar to that of the wave gear drive 1 shown in FIG. 1, the explanation of the basic configuration will be omitted.

A wave generator 64 of this wave gear drive 6 includes an outer annular hub 644 fitted in a fitting hole 642 formed in the center of a rigid cam plate 641 and an inner annular hub 645 inserted inside of the outer annular hub 644, both of which constitute a hub 643 connected to the input shaft.

The transfer-torque control mechanism includes an engaging hole 646 formed in the outer peripheral surface of the inner annular hub 645, a radially extending through hole 647 formed in the outer annular hub 644, a ball 648 inserted into the through hole 647 to be engaged with the engaging hole 646, and an elastic member 649 that urges the ball 648 radially inward.

As seen well from FIG. 5 (B), the elastic member 649 is formed as, for example, a coil spring, and a columnar member 649a is arranged on the ball side. Meanwhile a screw 649b is screwed into the through hole 647 on the opposite side. The force for urging the ball 648 can be controlled by adjusting the amount for screwing the screw 649b. The engaging hole 646 may be formed to, for example, a conical shape.

The transfer-torque control mechanism of this configuration defines the upper limit of the torque transferred by the engaging force between the ball 648 and the engaging hole 646. In the case where a torque exceeding the upper limit value is transferred, the ball 648 is disengaged from the engaging hole 646 against the spring force. As a result, a slip is generated between the inner annular hub 645 and the outer annular hub 644 in a rotational direction.

In the illustrated example, displacement of the outer annular hub 645 in the axial direction 1a is prevented by the annular flange 645a formed in the inner annular hub 645 and a retainer ring 645b mounted on the outer periphery of the end on the opposite side of the outer annular hub 645.

(Sixth Example)

Figure 6:
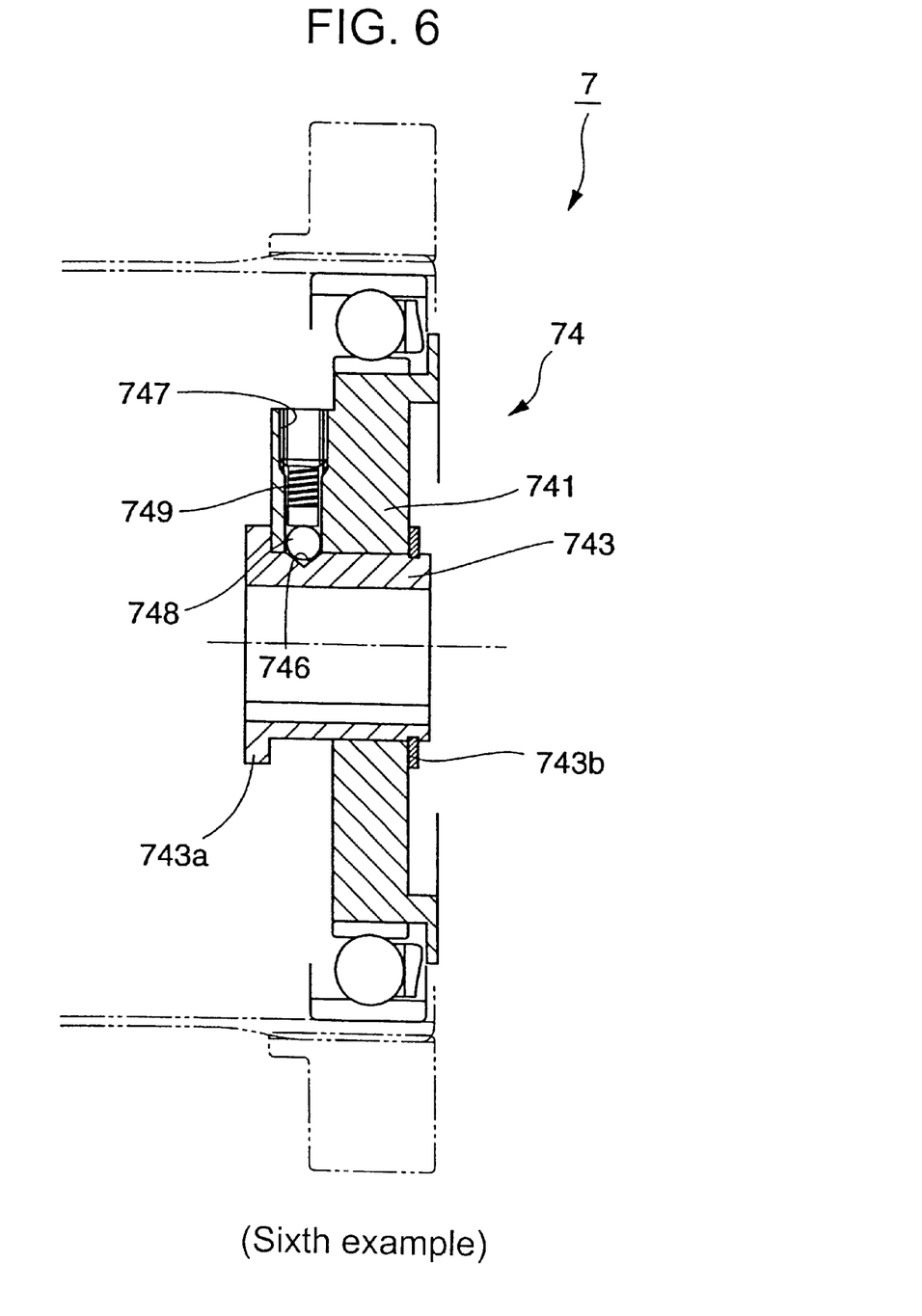
FIG. 6 shows a diagram schematically illustrating a configuration of the essential parts of a sixth embodiment of a wave gear drive to which the present invention is applied.

FIG. 6 shows the essential parts of a sixth embodiment of the wave gear drive to which the present invention is applied. The basic configuration of this wave gear drive 7 is similar to that of the wave gear drive 5 shown in FIG. 2. A wave generator 74 of this wave gear drive includes a hub (an annular hub in the drawing) 743 and a rigid cam plate 741. A transfer-torque control mechanism includes an engaging hole 746 formed in the outer peripheral surface of the hub 743, a radially extending through hole 747 formed in the rigid cam plate 741, a ball 748 inserted into the through hole 747 to be engaged with the engaging hole 746, and an elastic member 749 that urges the ball 748 radially inward. The operation of the transfer-torque control mechanism of the aforementioned configuration is similar to the one shown in FIG. 5.

Displacement of the rigid cam plate 741 in the axial direction 1a is prevented by the annular flange 743a formed on the hub 743 and the retainer ring 743b mounted on the outer periphery of the end opposite to the hub 743.

(Seventh Example)

Figure 7:
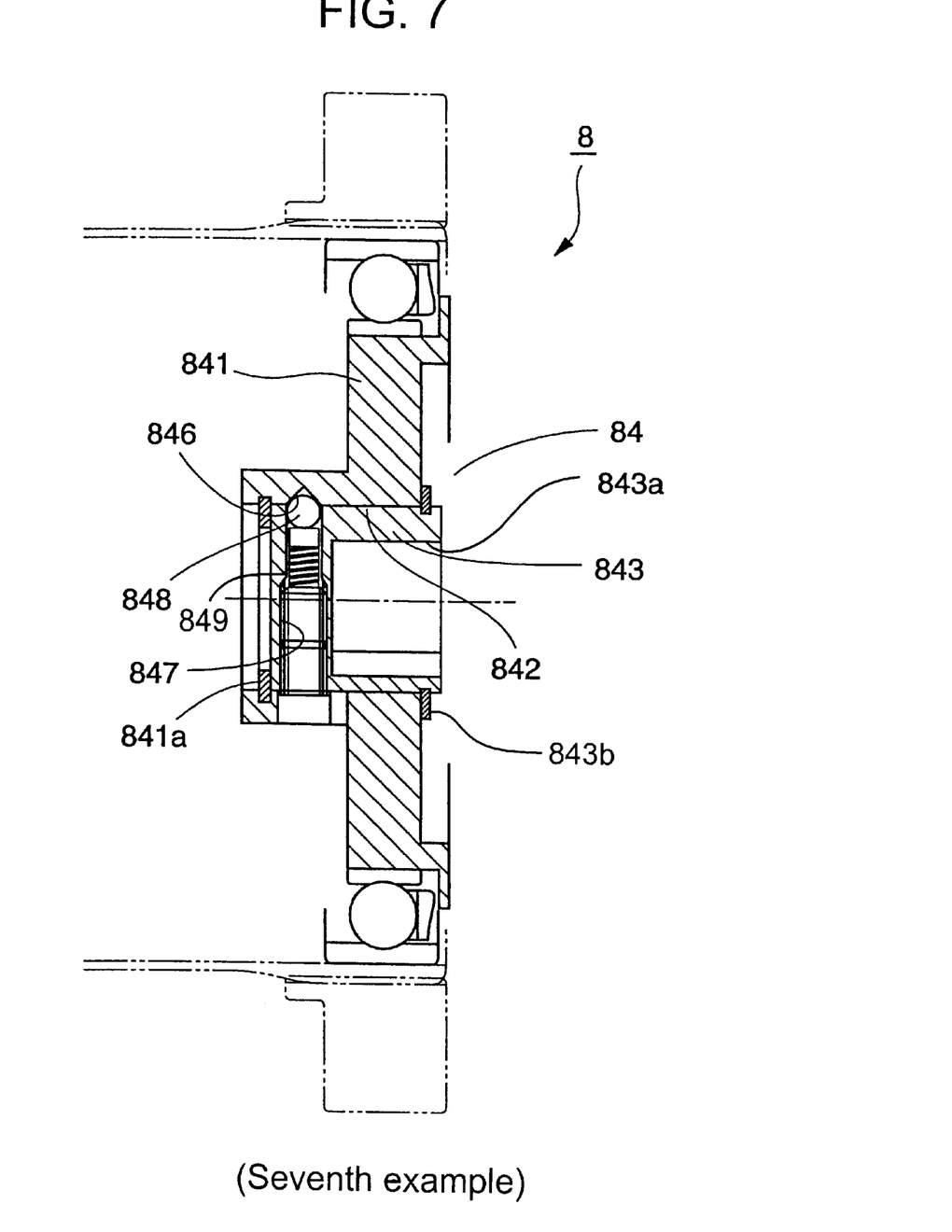
FIG. 7 shows a diagram schematically illustrating a configuration of the essential parts of a seventh embodiment of a wave gear drive to which the present invention is applied.

FIG. 7 shows the essential parts of a seventh embodiment of the wave gear drive to which the present invention is applied. The basic configuration of this wave gear drive 8 is similar to that of the wave gear drive 7 shown in FIG. 6.

A wave generator 84 of this wave gear drive 8 includes a rigid cam plate 841 and a hub 843 inserted in a fitting hole 842 formed in the center of the rigid cam plate 841. The hub 843 has an input shaft connecting hole 843a that opens only to one side in the axial direction 1a.

The transfer-torque control mechanism includes an engaging hole 846 formed in the inner peripheral surface of the fitting hole 842 of the rigid cam plate 841, a radially extending through hole 847 formed in the hub 843, a ball 848 inserted into the through hole 847 to be engaged with the engaging hole 846, and an elastic member 849 that urges the ball 848 radially outward.

In this case, the operation of the transfer-torque control mechanism is similar to that of the wave gear drives shown in FIGS. 5 and 6. Displacement of the rigid cam plate 841 in the axial direction 1a is prevented by the retainer rings 841a, 843b mounted on both sides.

(Eighth Example)

Figure 8:
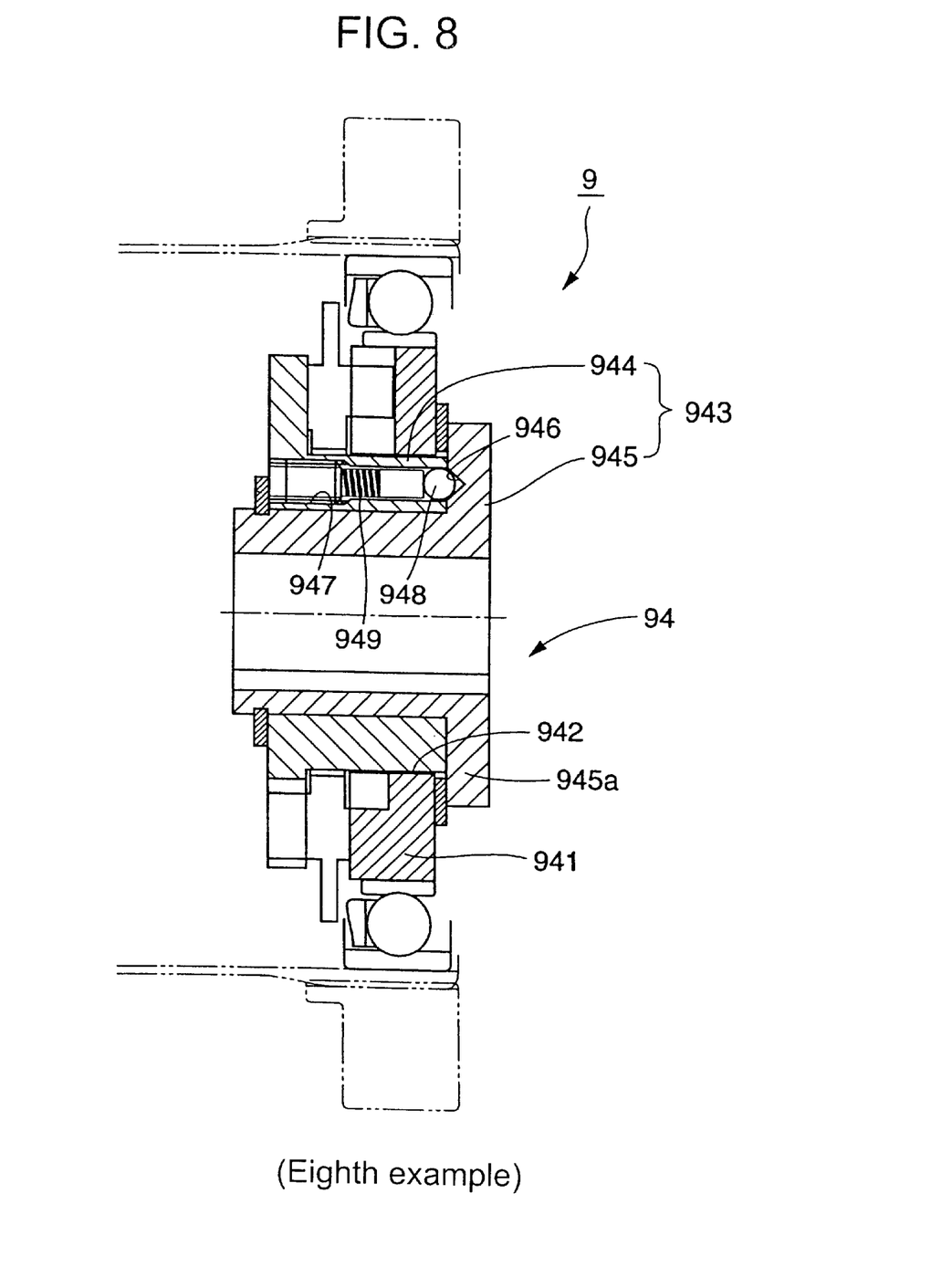
FIG. 8 shows a diagram schematically illustrating a configuration of the essential parts of an eighth embodiment of a wave gear drive to which the present invention is applied.

FIG. 8 shows the essential parts of an eighth embodiment of the wave gear drive according to this invention. The basic configuration of this wave gear drive 9 is similar to that of the wave gear drive 6 shown in FIG. 5. A wave generator 94 of this wave gear drive 9 includes an outer annular hub 944 fitted in a fitting hole 942 formed in the center of a rigid cam plate 941 and an inner annular hub 945 inserted inside of an outer annular hub 944, both of which constitute a hub 943.

The transfer-torque control mechanism includes an annular flange 945a radially expanding outward and formed at one end in the axial direction of the inner annular hub 945, an engaging hole 946 formed in the annular end surface of the annular flange 945a, an axially extending through hole 947 formed in the outer annular hub 944, a ball 948 inserted into the through hole 947 to be engaged with the engaging hole 946, and an elastic member 949 that urges the ball 948 in the axial direction 1a against the engaging hole 946. The operation of the transfer-torque control mechanism having the aforementioned configuration is basically similar to that of the wave gear drive 6 shown in FIG. 5.

The wave gear drive 9 of this configuration has the advantage that the increase in inertia of the apparatus can be suppressed as compared with the one shown in FIG. 5.

(Ninth Embodiment)

Figure 9:
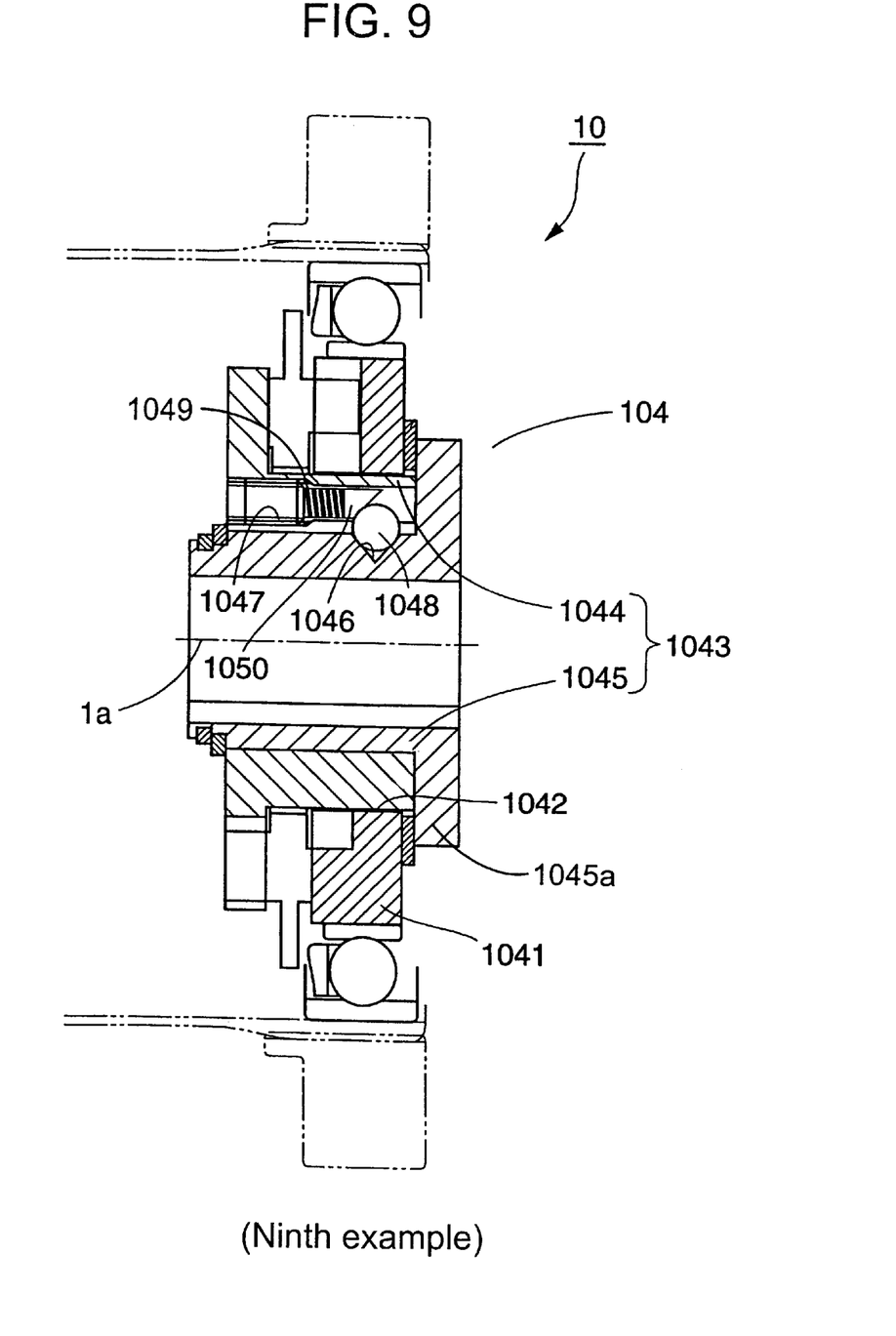
FIG. 9 shows a diagram schematically illustrating a configuration of the essential parts of a ninth embodiment of a wave gear drive to which the present invention is applied.

FIG. 9 shows the essential parts of a ninth embodiment of the wave gear drive according to this invention. The basic configuration of this wave gear drive 10 is similar to that of the wave gear drive 9 shown in FIG. 8. A wave generator 104 of this wave gear drive 10 includes an outer annular hub 1044 fitted in a fitting hole 1042 formed in the center of the rigid cam plate 1041 and an inner annular hub 1045 inserted inside of the outer annular hub 1044, both of which constitute a hub 1043.

The transfer-torque control mechanism includes an engaging hole 1046 formed in the outer peripheral surface of the inner annular hub 1045, a through hole 1047 formed in the outer annular flange and extending in the axial direction 1a, a ball 1048 inserted into the through hole 1047 to be engaged with the engaging hole 1046, and an elastic member 1049 that urges the ball 1048 against the engaging hole 1046. In this example, a holder 1050 having a surface slanted at 45° formed on the top end surface is inserted into the top end of the elastic member 1049. As a result, the urging force generated by the elastic member 1049 in the axial direction 1a transforms into the force urging the ball 1048 radially inward through the holder 1050.

The inner annular hub 1045 can be integrated with the input shaft connected thereto. Also, since the ball functions as a retainer in the axial direction of the hub 1044, the annular flange 1045a formed at the end of the inner annular hub 1045 can be omitted.

Figure 10:
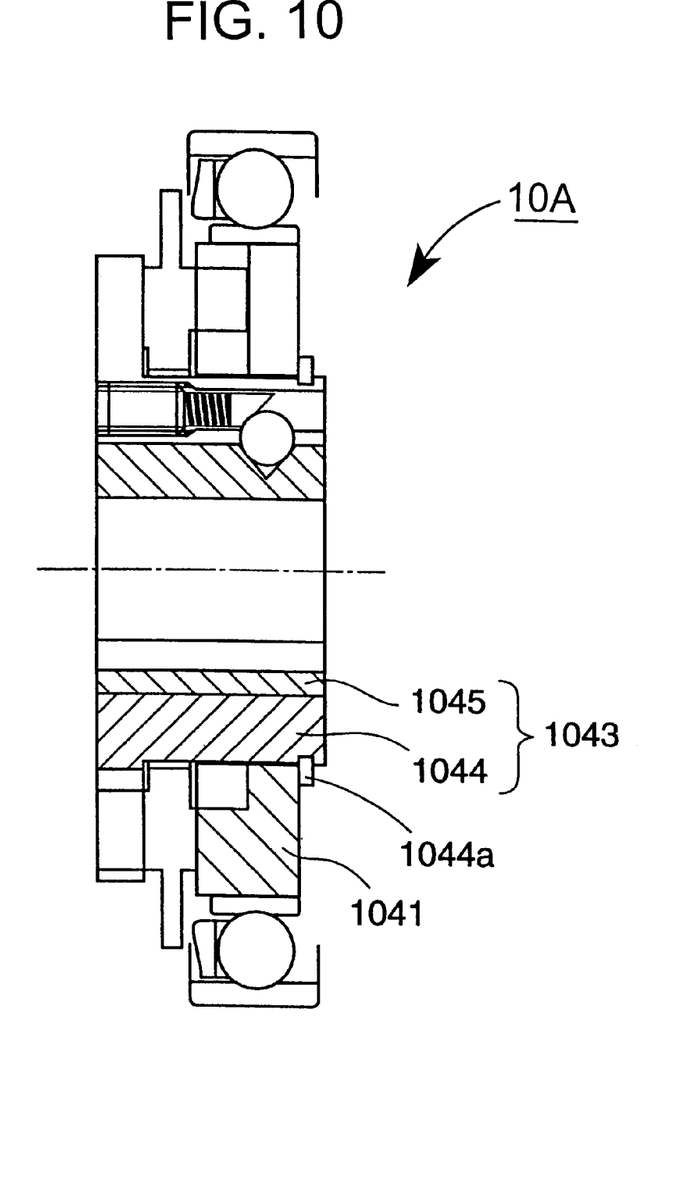
FIG. 10 shows a diagram schematically illustrating a configuration of the essential parts of a modified example of the wave gear drive illustrated in FIG. 9.

FIG. 10 shows the essential parts of a modified example of the wave gear drive 10 as described above. This wave gear drive 10A employs no annular flange 1045a formed at the end of the inner annular hub 1045 shown in FIG. 9. The wave gear drive 10A instead employs a retainer ring 1044a mounted on the outer annular hub 1044.

Figure 11:
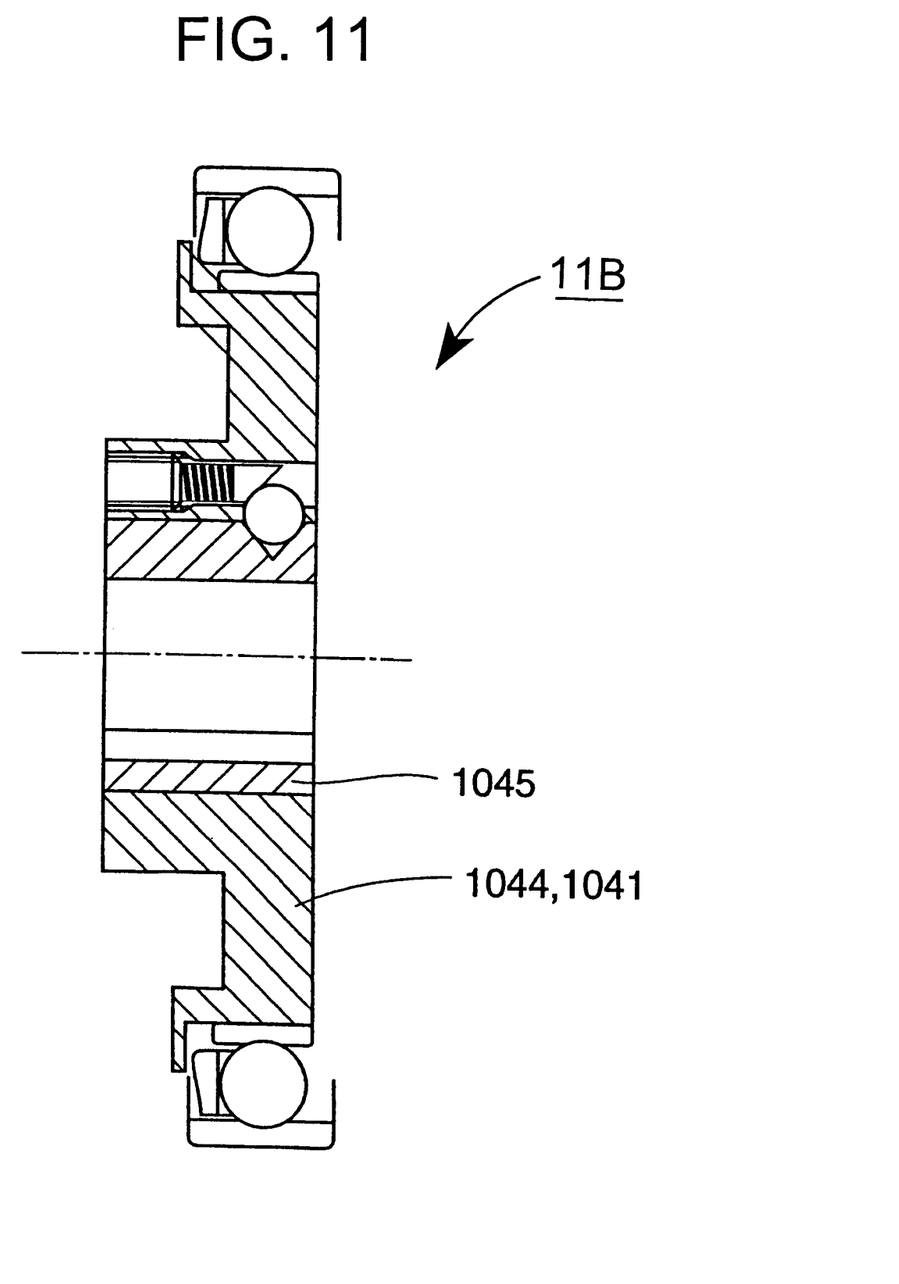
FIG. 11 shows a diagram schematically illustrating a configuration of the essential parts of another modified example of the wave gear drive illustrated in FIG. 9.

Meanwhile FIG. 11 shows the essential parts of still another modified example of the wave gear drive 10. In this wave gear drive 10B, the rigid cam plate 1041 and the outer annular hub 1044 in FIG. 10 are formed as a single part.

(Tenth Example)

Figure 12A:
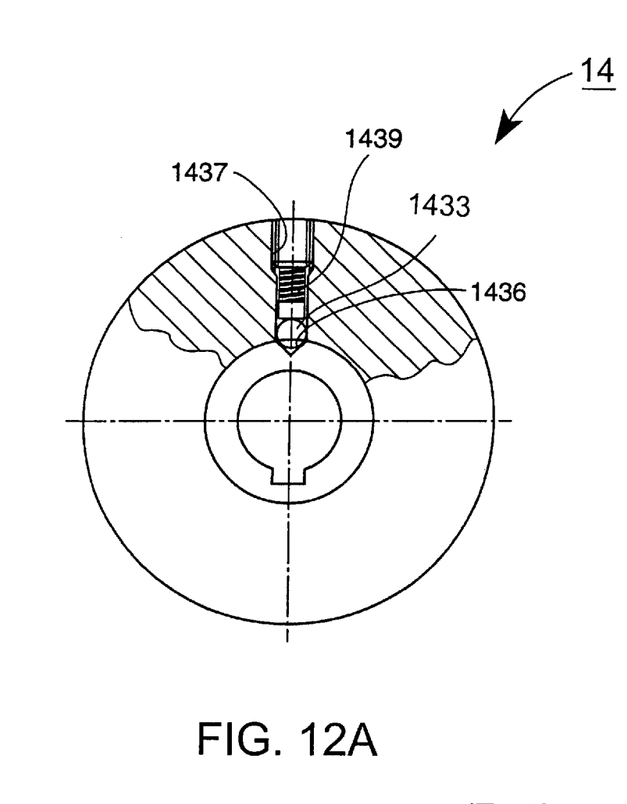
FIG. 12 shows a side view and a longitudinal sectional view illustrating a configuration of the essential parts of a tenth embodiment of a wave gear drive according to the present invention.
Figure 12B:
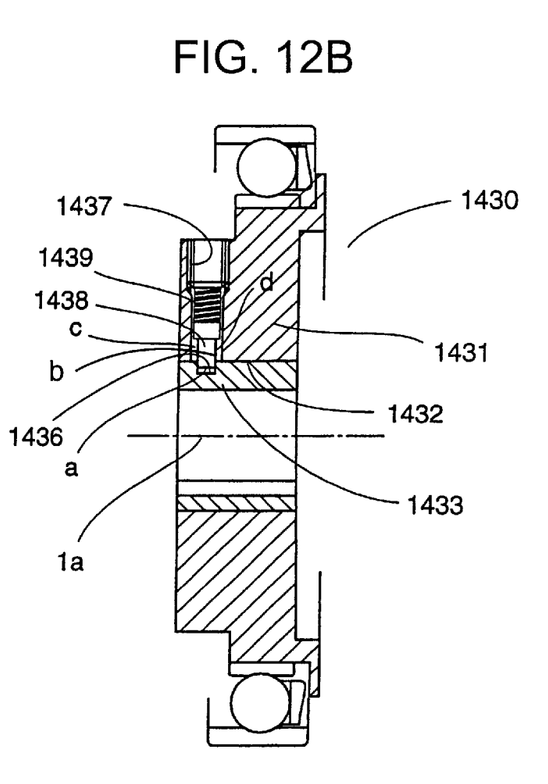

Next, FIG. 12 shows the essential parts of a tenth embodiment of the wave gear drive according to this invention. The basic configuration of this wave gear drive 14 is similar to that of the wave gear drive 10B shown in FIG. 11.

A wave generator 1430 of the wave gear drive 14 includes a rigid cam plate 1431 and an annular hub 1433 inserted into the fitting hole 1432 formed in the rigid cam plate 1431.

The transfer-torque control mechanism includes an engaging hole 1436 formed in the outer peripheral surface of the annular hub 1433, a radially extending through hole 1437 formed in the rigid cam plate 1431, a columnar roller 1438 inserted into the through hole 1437 to be engaged with the engaging hole 1436, and an elastic member 1439 that urges the roller 1438 radially inward.

In this example, the engagement between the end surfaces a, b in the axial direction 1a of the engaging hole 1436 and the end surfaces c, d of the roller serves to prevent displacement of the rigid cam plate 1431 and the annular hub 1433 in the axial direction 1a.

(11th Example)

Figure 13:
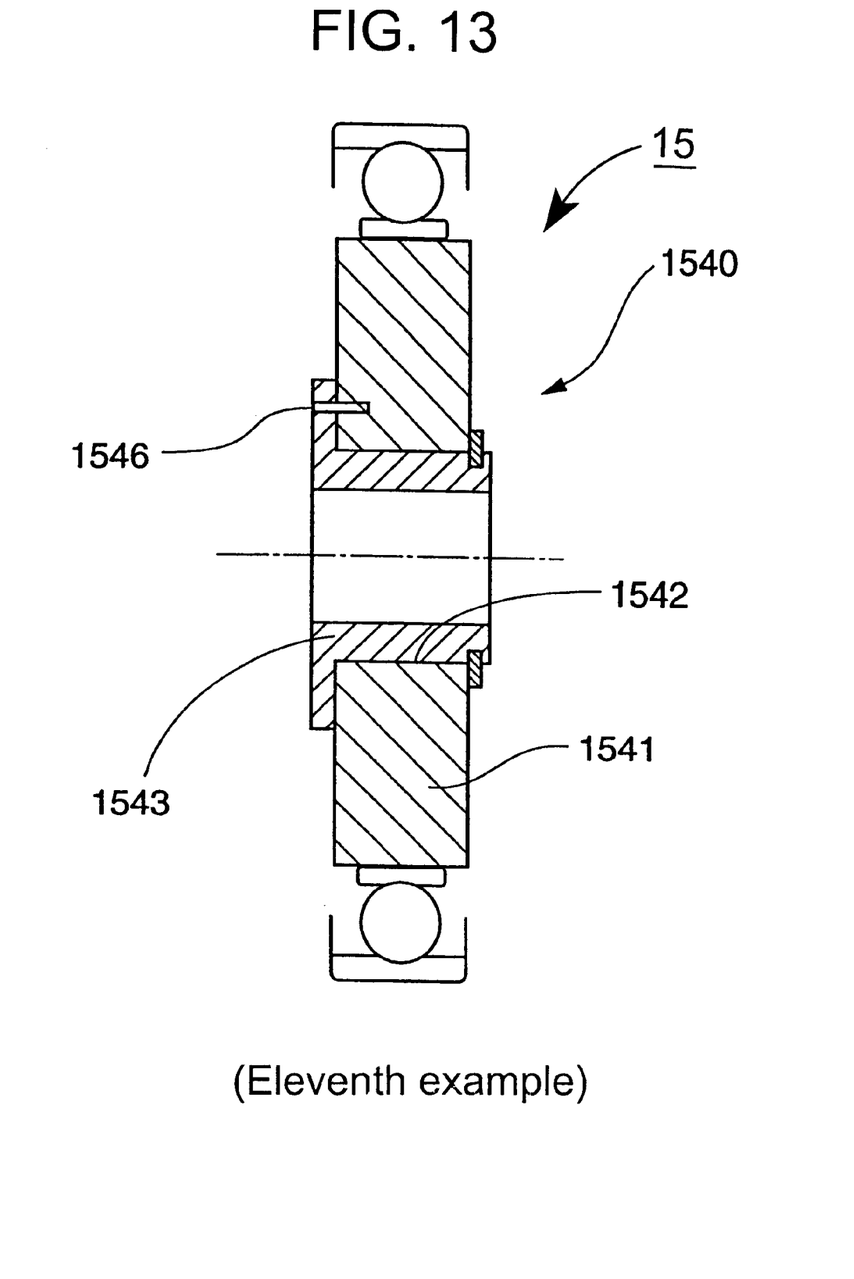
FIG. 13 shows a diagram schematically illustrating a configuration of the essential parts of an eleventh embodiment of a wave gear drive according to this invention.

Meanwhile FIG. 13 shows the essential parts of an eleventh embodiment of the wave gear drive according to this invention. The basic configuration of this wave gear drive 15 is similar to that of the wave gear drive according to each of the embodiments as described above.

A wave generator 1540 of the wave gear drive 15 includes a rigid cam plate 1541 having a predetermined outline, and a hub 1543 inserted into a fitting hole 1542 formed in the center of the rigid cam plate 1541.

The transfer-torque control mechanism for limiting the torque transferred to the flexible external gear employed in the wave gear drive includes at least one pin 1546 inserted into the rigid cam plate 1541 and the hub 1543. The breaking torque of this pin is set to assume a predetermined value.

With the wave gear drive 15 having this configuration, in the case where the torque exceeding the breaking torque of the pin 1546 is transferred, the pin 1546 breaks to prevent transfer of the torque exceeding the breaking torque. This transfer-torque control mechanism is simply configured but becomes out of work once the pin 1546 breaks.

In this case, the hub 1543 can be integrated with the input shaft connected thereto.

As described above, in the wave gear drive according to this invention, the rigid cam plate and the hub constituting the wave generator are fastened together such that a slip is generated in the rotational direction therebetween by transferring the torque exceeding a predetermined value. As a result, it is allowed to function as a torque limiting mechanism. Unlike the conventional art requiring the torque limiter additionally provided, the present invention realizes a small, compact power transmission system, thus reducing the manufacturing cost.

What is claimed is:

1. A wave gear drive including an annular rigid internal gear, an annular flexible external gear arranged inside of said annular rigid internal gear, and a wave generator fitted inside of said annular flexible external gear, in which said wave generator urges said flexible external gear radially so as to be partially in mesh with said rigid internal gear, and moves points of partial engagement in the circumferential direction so as to generate a relative rotation between said rigid internal gear and said flexible external gear corresponding to the difference in the number of teeth therebetween, wherein:

said wave generator includes a rigid cam plate having a predetermined outline and a hub inserted into a fitting hole formed in a center of said rigid cam plate; and said wave generator further includes a transfer-torque control mechanism for limiting a torque transferred to said flexible external gear through said wave generator, said transfer-torque control mechanism being configured to fasten said rigid cam plate and said hub so as to generate a slip in a rotational direction by transferring a torque exceeding a predetermined value.

2. A wave gear drive according to claim 1, wherein:

said wave generator includes an outer annular hub with an Oldham's mechanism fitted in the fitting hole formed in the center of said rigid cam plate and an inner annular hub inserted inside of said outer annular hub, both of which constitute said hub; and said transfer-torque control mechanism includes an annular flange radially expanding outward and formed at one end of said inner annular hub in an axial direction, an external thread formed on an outer peripheral surface of the other end of said inner annular hub in the axial direction, and a nut having an internal thread formed on an inner peripheral surface so as to be screwed with said external thread, and said outer annular hub being urged against said annular flange by said nut.

3. A wave gear drive according to claim 1, wherein said transfer-torque control mechanism includes an annular flange radially expanding outward and formed at one end of said hub in an axial direction, an external thread formed on an outer peripheral surface of the other end of said annular hub in the axial direction, and a nut having an internal thread formed on an inner peripheral surface so as to be screwed with said external thread, said rigid cam plate being urged against said annular flange by said nut.

4. A wave gear drive according to claim 3, wherein said hub is integrated with an input shaft connected thereto.

5. A wave gear drive according to claim 4, wherein said external thread and said nut are replaced by an axially extending bolt hole formed in an end surface of said input shaft and a fastening bolt adapted to be screwed into said bolt hole, said rigid cam plate being urged against said annular flange by said fastening bolt.

6. A wave gear drive according to claim 1, wherein:

said wave generator includes an outer annular hub with an Oldham's mechanism fitted in a fitting hole formed in the center of said rigid cam plate and an inner annular hub inserted inside of said outer annular hub, both of which constitute said hub; and said transfer-torque control mechanism includes an engaging hole formed in an outer peripheral surface of said inner annular hub, a radially extending through hole formed in said outer annular hub, a ball inserted into said through hole to be engaged with said engaging hole, and an elastic member that urges said ball radially inward.

7. A wave gear drive according to claim 1, wherein said transfer-torque control mechanism includes an engaging hole formed in an outer peripheral surface of said hub, a radially extending through hole formed in said rigid cam plate, a ball inserted into said through hole to be engaged with said engaging hole, and an elastic member that urges said ball radially inward.

8. A wave gear drive according to claim 1, wherein said transfer-torque control mechanism includes an engaging hole formed in an inner peripheral surface of the fitting hole of said rigid cam plate, a radially extending through hole formed in said hub, a ball inserted into said through hole to be engaged with said engaging hole, and an elastic member that urges said ball radially outward.

9. A wave gear drive according to claim 1, wherein:

said wave generator includes an outer annular hub with an Oldham's mechanism fitted in the fitting hole formed in the center of said rigid cam plate, and an inner annular hub inserted inside of said outer annular hub, both of which constitute said hub; and said transfer-torque control mechanism includes an annular flange radially expanding outward and formed at one end of said inner annular hub in an axial direction, an engaging hole formed in an annular end surface of said annular flange, an axially extending through hole formed in said outer annular flange, a ball inserted into said through hole to be engaged with said engaging hole, and an elastic member that urges said ball against said engaging hole in the axial direction.

10. A wave gear drive according to claim 1, wherein:

said wave generator includes an outer annular hub with an Oldham's mechanism fitted in the fitting hole formed in the center of said rigid cam plate, and an inner annular hub inserted inside of said outer annular hub, both of which constitute said hub; and said transfer-torque control mechanism includes an engaging hole formed in an outer peripheral surface of said inner annular hub, an axially extending through hole formed in said outer annular flange, a ball inserted into said through hole to be engaged with said engaging hole, and an elastic member that urges said ball against said engaging hole.

11. A wave gear drive according to claim 10, wherein said inner annular hub is integrated with an input shaft connected thereto.

12. A wave gear drive according to claim 10 or 11, wherein said outer annular hub and said rigid cam plate are integrated.

13. A wave gear drive according to claim 1, wherein:

said transfer-torque control mechanism includes an engaging hole formed in an outer peripheral surface of said hub, a radially extending through hole formed in said rigid cam plate, a roller inserted into said through hole to be engaged with said engaging hole, and an elastic member that urges said roller radially inward; and the engagement between an axial end surfaces of said engaging hole and an end surfaces of said roller prevents displacement of said rigid cam and said annular hub in the axial direction.

14. A wave gear drive according to claim 1, wherein said transfer-torque control mechanism includes at least one pin inserted into said rigid cam plate and said hub, a breaking torque of said pin being set to assume a predetermined value.

15. A wave gear drive according to claim 14, wherein said hub is integrated with an input shaft connected thereto.

* * * * *